US009353816B2

(12) United States Patent
La Forest et al.

(10) Patent No.: US 9,353,816 B2
(45) Date of Patent: *May 31, 2016

(54) LOW COST, HIGH DENSITY AIRCRAFT FRICTION MATERIALS UTILIZING LOW FIBER VOLUME NONWOVEN PREFORMS WITH PITCH DENSIFICATION

(75) Inventors: Mark L. La Forest, Granger, IN (US); Mark Criss James, Plymouth, IN (US); Neil Murdie, Granger, IN (US)

(73) Assignee: Honeywell International Inc., Morris Plains, NJ (US)

( * ) Notice: Subject to any disclaimer, the term of this patent is extended or adjusted under 35 U.S.C. 154(b) by 489 days.

This patent is subject to a terminal disclaimer.

(21) Appl. No.: 12/576,671

(22) Filed: Oct. 9, 2009

(65) Prior Publication Data

US 2011/0083305 A1 Apr. 14, 2011

(51) Int. Cl.
*D04H 1/46* (2012.01)
*F16D 69/02* (2006.01)
*C04B 35/83* (2006.01)
*B32B 18/00* (2006.01)
*C04B 35/645* (2006.01)
*F16D 69/00* (2006.01)

(52) U.S. Cl.
CPC .............. *F16D 69/023* (2013.01); *B32B 18/00* (2013.01); *C04B 35/645* (2013.01); *C04B 35/83* (2013.01); *C04B 2235/614* (2013.01); *C04B 2235/656* (2013.01); *C04B 2235/661* (2013.01); *C04B 2235/77* (2013.01); *C04B 2237/385* (2013.01); *F16D 2069/008* (2013.01)

(58) Field of Classification Search
None
See application file for complete search history.

(56) References Cited

U.S. PATENT DOCUMENTS

| 576,671 | A | 2/1897 | Hamlin |
| 4,318,955 | A | 3/1982 | Kulakov et al. |
| 5,338,320 | A | 8/1994 | Fukuda et al. |
| 5,388,320 | A | 2/1995 | Smith et al. |
| 5,882,781 | A | 3/1999 | Lawton et al. |
| 5,952,075 | A | 9/1999 | Clarke et al. |
| 6,077,464 | A | 6/2000 | Murdie et al. |
| 6,183,583 | B1 * | 2/2001 | Duval ................ C04B 35/83 156/148 |
| 6,342,171 | B1 | 1/2002 | Murdie et al. |
| 6,365,257 | B1 | 4/2002 | Hecht |
| 6,537,470 | B1 | 3/2003 | Wood et al. |
| 6,691,393 | B2 | 2/2004 | James et al. |
| 6,939,490 | B2 | 9/2005 | La Forest et al. |
| 7,025,913 | B2 | 4/2006 | La Forest et al. |
| 7,172,408 | B2 | 2/2007 | Wood et al. |
| 7,252,499 | B2 | 8/2007 | LaForest et al. |
| 7,374,709 | B2 | 5/2008 | Bauer |
| 9,017,761 | B2 | 4/2015 | La Forest et al. |
| 2001/0019752 | A1 * | 9/2001 | Purdy et al. ............. 428/64.1 |
| 2002/0170787 | A1 | 11/2002 | James et al. |
| 2003/0100239 | A1 | 5/2003 | Gaffney et al. |
| 2003/0214064 | A1 | 11/2003 | Shin et al. |
| 2004/0105969 | A1 | 6/2004 | Huang et al. |
| 2006/0046059 | A1 | 3/2006 | Arico et al. |
| 2006/0151912 | A1 | 7/2006 | Bauer |
| 2006/0177663 | A1 * | 8/2006 | Simpson et al. ............. 428/408 |
| 2006/0279012 | A1 | 12/2006 | Simpson et al. |
| 2007/0186396 | A1 | 8/2007 | Linck et al. |
| 2007/0270069 | A1 | 11/2007 | Lee et al. |
| 2008/0041674 | A1 | 2/2008 | Walker et al. |
| 2008/0090064 | A1 | 4/2008 | James et al. |
| 2009/0194895 | A1 * | 8/2009 | La Forest et al. ............. 264/29.5 |

FOREIGN PATENT DOCUMENTS

| EP | 1724245 A1 | 11/2006 |
| EP | 1 911 990 A2 | 4/2008 |
| EP | 1 911 990 A3 | 4/2009 |
| EP | 2 093 453 A1 | 8/2009 |
| WO | 98/27023 | 6/1998 |
| WO | 98/49382 A1 | 11/1998 |
| WO | 00/61518 A1 | 10/2000 |
| WO | 2006/101799 A2 | 9/2006 |

OTHER PUBLICATIONS

European Search Report from corresponding EP Application No. 10176494.2, mailed Jan. 19, 2011, 3 pages.

(Continued)

*Primary Examiner* — Joseph Miller, Jr.
(74) *Attorney, Agent, or Firm* — Shumaker & Sieffert, P.A.

(57) ABSTRACT

Method of making a carbon-carbon composite brake disc or pad by: needling a plurality of layers of fibrous fabric segments to one another to form a brake disc or pad preform; carbonizing the fibrous preform to provide a carbon fiber brake disc or pad preform having a fiber volume fraction in the range 17% to 30% in the brake disc or pad preform; densifying the resulting carbonized needled fibrous fabric preform with pitch (isotropic or anisotropic) or with pitch and CVD/CVI; carbonizing the resulting pitch-infiltrated carbon fiber disk to carbonize the pitch therein; heat-treating the resulting pitch-densified carbon brake disc or pad; and subjecting the carbon brake disc or pad to a final cycle of CVD/CVI processing in order to produce a carbon-carbon composite brake disc or pad having a density of at least 1.70 g/cc and having a uniform through-thickness density. Benefits over conventional processing are obtained by increasing the needling rate used to manufacture the preform and reducing the amount of fiber used in the preform. In addition, the use of pitch in combination with CVI/CVD to densify the carbon fiber preform enables higher final densities to be achieved. This carbon-carbon composite manufacturing method also benefits from lowered manufacturing cycle time.

19 Claims, No Drawings

(56) References Cited

OTHER PUBLICATIONS

U.S. Appl. No. 12/536,924, titled "Nonwoven Preforms Made With Increased Areal Weight Fabric Segments for Aircraft Friction Materials", filed Aug. 6, 2009.
U.S. Appl. No. 12/617,418, titled "Increased Area Weight Segments With Pitch Densification to Produce Lower Cost and Higher Density Aircraft Friction Materials", filed Nov. 12, 2009.
U.S. Appl. No. 12/469,384, titled "Low Cost, High Density C-C Composites Densified by CVD/CVI for Aircraft Friction Materials" filed May 20, 2009.
Examination Report from corresponding EP Application No. 10 176 494.2 mailed Feb. 20, 2012, 5 pages.
Office Action dated Sep. 29, 2011 for U.S. Appl. No. 12/469,384, 29 pgs.
Responsive Amendment dated Dec. 28, 2011 for U.S. Appl. No. 12/469,384, 9 pgs.
Final Office Action dated Jan. 12, 2012 for U.S. Appl. No. 12/469,384, 18 pgs.
Responsive Amendment dated Mar. 12, 2012 for U.S. Appl. No. 12/469,384, 10 pgs.
Advisory Action dated Mar. 22, 2012 for U.S. Appl. No. 12/469,384, 3 pgs.
Pre-Appeal Brief Request for Review dated Apr. 12, 2012 for U.S. Appl. No. 12/469,384, 5 pgs.
Prosecution History from U.S. Pat. No. 9,017,761, dated Jul. 25, 2012 through Mar. 30, 2015, 24 pp.
Decision on Appeal from co-pending U.S. Appl. No. 12/469,384, dated Jul. 14, 2014, 10 pp.
Response to Examination Report dated Apr. 5, 2013, from counterpart European application No. 10176494.2, filed Aug. 27, 2013, 14 pp.
Notice of Allowance from U.S. Appl. No. 12/469,384, dated Dec. 23, 2014, 7 pp.
Request for Rehearing in response to Patent Trial and Appeal Board Decision dated Jul. 14, 2014, from U.S. Appl. No. 12/469,384, filed Sep. 15, 2014, 5 pp.
Reply to communication from the Examining Division, for EP Application No. 10 176 494.2, dated Jul. 30, 2012, 12 pages.

* cited by examiner

LOW COST, HIGH DENSITY AIRCRAFT FRICTION MATERIALS UTILIZING LOW FIBER VOLUME NONWOVEN PREFORMS WITH PITCH DENSIFICATION

FIELD OF THE INVENTION

The present invention relates to carbon-carbon composite materials which are useful as friction materials, particularly, brake discs and pads. The carbon-carbon composite preforms are made by needling together woven or nonwoven fabric made from carbon fiber precursors such as polyacrylonitrile fibers or pitch fibers. In accordance with the present invention, the carbon fiber preforms are then infiltrated with pitch, optionally followed by CVI/DVD densification, in order to increase their density in an economical manner.

BACKGROUND OF THE INVENTION

At present, the brake discs of military and commercial aircraft are normally made from carbon-carbon composites. Traditionally, C—C composites used as friction materials are produced by combining carbon fibers with a carbon matrix material which is deposited around the fibers using a Chemical Vapor Infiltration (CVI) process or a Chemical Vapor Deposition (CVD) process to provide the composites with the requisite density. CVI/CVD processing is an expensive, capital intensive, and time-consuming process, frequently taking several months to complete. Therefore, there is a need for improvements to the densification procedure in the manufacture of C—C composite friction materials. Such desirable improvements ideally include reduction in capital investment, improvements to the mechanical and thermal properties of the composites, and improvement to the friction and wear performance of the friction material (e.g., aircraft brake discs) made from the composites.

Background prior art with respect to nonwoven preform aspects of the present invention includes the following. EP 1 724 245 A1 describes a process for producing carbon-carbon composite preform, by: providing short carbon fiber or fiber precursor segments; providing particulate pitch; combining the fiber segments and pitch particles in a mold; subjecting the resulting mixture to elevated pressure to create an uncarbonized preform; placing the preform in a constraint fixture; and carbonizing the combined components in the constraint fixture at an elevated temperature to provide a preform having a desired density. US 2008/0090064 A1 discloses a carbon-carbon composite material comprising carbonized woven or nonwoven fabric-based preforms. A method taught in this document contemplates densifying the preform and subsequently adding a ceramic additive thereto in order to enhance the properties of the final product. US 2008/0041674 A1 discloses annular drive inserts which are placed within an annular opening within a brake disk. The annular drive inserts may comprise carbon-carbon composite which has been treated with antioxidant. U.S. Pat. No. 7,374,709 B2 describes a method in which specific end-use application friction requirements are satisfied by tailoring a level of carbon in a selected carbon/carbon preform, heat treating the carbon/carbon composite preform to affect thermal conductivity so as to optimize overall braking performance prior to ceramic processing, and by selecting an optimum level of ceramic hard phase to achieve satisfactory friction disc wear life and friction characteristics of a resulting braking material. Additional background patents and publications include: U.S. Pat. No. 7,252,499 B2; U.S. Pat. No. 7,172,408 B2; U.S. Pat. No. 7,025,913 B2; and U.S. Pat. No. 6,939,490 B2.

Background prior art with respect to the densification aspects of the present invention includes the following. US 2006/0279012 A1 discloses a carbon fiber preform densification by pitch infiltration wherein the pitch infiltration step may be facilitated by the application of vacuum and/or pressure. U.S. Pat. No. 4,318,955 discloses a method of making a carbon brake product wherein fibers are packed and then twice saturated with pyrocarbon, with a machining step therebetween, and heat treatment at 2000° C., to a final density of 1.75-1.8 g/cm. U.S. Pat. No. 6,077,464 discloses a method of making carbon-carbon composite materials which includes a variety of densification methods which may be used singularly or in various combinations. See e.g. column 4, lines 40-45. U.S. Pat. No. 6,342,171 B1 discloses a process of stabilizing a pitch-based carbon foam which includes densification of the foam with four cycles of combined VPI and PIC. See e.g. column 12, lines 8-40. US 2004/0105969 A1 discloses manufacture of carbon composites which includes densification of the preform by resin or pitch via vacuum and pressure.

SUMMARY OF THE INVENTION

Method of making a carbon-carbon composite brake disc or pad by: needling a plurality of layers of fibrous fabric segments to one another to form a brake disc or pad preform; carbonizing the fibrous preform to provide a carbon fiber brake disc or pad preform having a fiber volume fraction in the range 17% to 30% in the brake disc or pad preform; densifying the resulting carbonized needled fibrous fabric preform with pitch (isotropic or anisotropic) or with pitch and CVD/CVI; carbonizing the resulting pitch-infiltrated carbon fiber disk to carbonize the pitch therein; heat-treating the resulting pitch-densified carbon brake disc or pad; and subjecting the carbon brake disc or pad to a final cycle of CVD/CVI processing in order to produce a carbon-carbon composite brake disc or pad having a density of at least 1.70 g/cc and having a uniform through-thickness density. Benefits over conventional processing are obtained by increasing the needling rate used to manufacture the preform and reducing the amount of fiber used in the preform. In addition, the use of pitch in combination with CVI/CVD to densify the carbon fiber preform enables higher final densities to be achieved. This carbon-carbon composite manufacturing method also benefits from lowered manufacturing cycle time.

This invention provides a method of manufacturing a low cost, high density carbon-carbon composite friction material through a combination of reduced fiber volume fraction and the use of pitch or pitch and CVI/CVD densification. The carbon-carbon composite materials provided by the present invention are useful as friction materials, such as brake discs and pads.

Carbon-carbon composites in accordance with the present invention are made by needling together fabric (woven or nonwoven) made from carbon-containing fibers such as PAN or pitch, followed by carbonizing the fabric (preforms). The carbon fiber preforms can be needled either in the carbonized or in the pre-carbonized state. The uncarbonized fiber preforms would have to go through a carbonization/heat-treat step following the needling process. Final preform thickness and fiber volume is also controlled at carbonization, for instance by varying the level of pressure applied to the preforms during carbonization. That is, the preforms may be unconstrained during carbonization (i.e., no pressure is applied to them). Alternatively, the preforms may be constrained during carbonization, typically by means of applying pressure (e.g., weights placed on top of the preforms).

In accordance with the present invention, the preforms are then infiltrated with low cost pitch, in place of at least some CVD/CVI processing, in order to increase their density, reduce cycle time, and reduce their cost. This provides an economically produced carbon-carbon composite which is suitable for use as, e.g. a brake disc or pad, in both aircraft and automotive brake systems. Benefits of the present invention over conventional processing are obtained, among other ways, by increasing the needling rate used to manufacture the preform and reducing the amount of fiber used in the preform. In addition, the use of pitch in combination with CVI/CVD to densify the carbon fiber preform enables higher final densities to be achieved.

The carbon-carbon composite manufacturing method described in this invention benefits from lowered manufacturing cycle time. The reduction in the use of CVD/CVI furnace time to make a given quantity of brake components improves economics both by making the expensive CVD/CVI furnaces available to make additional brake components more quickly, thus spreading the cost of the furnaces over a larger number of products, and also reduces the overall cost of manufacturing by lowering inventory—that is, there is less Work-In-Progress with the present invention. As product-specific benefits, increased density of the final composite provided by the present invention is accompanied by improved mechanical strength and friction properties.

DETAILED DESCRIPTION OF THE INVENTION

High performance carbon brakes for aerospace and automotive applications are typically provided by needle punching oxidized PAN fibers into a preform using needlers. The preform is needled to a desired weight, thickness, and preform density, which properties are controlled by the needle stroke rate, the needle pattern density, and in some cases by rotational speed of the needler bowl. In accordance with the present invention, the needlers are run at a faster rate for shorter time periods, and the fiber volume fraction of the final C—C composite may be reduced, as compared to in the manufacture of conventional aircraft and automotive friction materials. The invention thus results in shortened overall cycle time and reduced material and labor costs.

The target volume fraction of the carbon fiber preform and final composite (brake disc or pad) produced in accordance with the present invention is typically defined in the range 17% to 30%. The fiber volume fraction is controlled by: 1) the amount of fiber used in the initial fiber preform; and 2) the level of compression during carbonization.

The target final density of the composite (brake disc or pad) is typically defined in the range 1.6 to 1.9 grams per cubic centimeter. The final density of the composite is controlled by: 1) the type and amount of pitch and CVI/CVD densification processing; 2) the number of densification cycles (% porosity); 3) the fiber volume fraction; 4) the type of fiber; and 5) heat treatment temperature.

This invention provides a method of making a carbon-carbon composite brake disc or brake pad which comprises the sequential steps of: (i) providing segments of fabric comprised of fibers, such as polyacrylonitrile, pitch, rayon, etc. fibers, which fibers may be pre- or post-carbonized; (ii) providing a needler capable of needling layers of the fibrous fabric segments to one another; (iii) needling a plurality of layers of said fibrous fabric segments to one another, thereby combining the fibrous fabric segment layers into a brake disc or pad preform, wherein said needlers can be: annular rotating needlers, annular non-rotating needlers, or non annular needlers; (iv) carbonizing said fibrous preform, with or without constraint, at 1200-2540° C. to provide a carbon fiber brake disc or brake pad preform having a fiber volume fraction in the range 17% to 30% in the brake disc or brake pad preform (and in a finished product brake disc and brake pad made from said preform); (v) densifying the resulting carbonized needled fibrous fabric preform with pitch (isotropic or anisotropic) or with pitch and CVD/CVI, to substitute higher density carbon from the pitch and/or CVD/CVI processing for lower density fiber in corresponding brake discs or brake pads having a lower fiber volume fraction, wherein the carbon fiber preform is densified by pitch, e.g., vacuum pressure infiltration (VPI) or resin transfer molding (RTM) processing; (vi) carbonizing the resulting pitch-infiltrated carbon fiber disk at 600-1200° C. to carbonize the pitch therein; (vii) heat-treating the resulting pitch-densified carbon brake disc or brake pad at 1200-2540° C.; (viii) subjecting said carbon brake disc or brake pad to a final cycle of CVD/CVI processing in order to produce a carbon-carbon composite brake disc or pad which has a density of at least 1.75 g/cc and which has a uniform through-thickness density; and (ix) optionally subjecting said carbon brake disc or brake pad to a final heat treat at 1200-2540° C.

By practicing the foregoing method of manufacturing composite brake discs and pads, cost reductions are gained, with respect to otherwise similar manufacturing methods in which the brake disc or brake pad preform has a conventional fiber volume fraction and in which no pitch densification step is employed, from: faster preforming rates; less fiber used in the preform; reduced number of densification steps to meet the final targeted density; reduced capital investment in high cost CVD/CVI furnaces; and reduced manufacturing cycle times.

The foregoing method may include an optional oxidative stabilization step prior to carbonization to prevent exudation from the preform during carbonization. The foregoing method may include an optional machining step after carbonization to open porosity at the surface(s) of the carbon disc prior to further densification (via pitch, CVI/CVD, etc.).

In one embodiment, this invention provides a method of making a carbon-carbon composite brake disc or pad which comprises the following sequential steps. A fibrous fabric comprised of carbon precursor fibers selected from the group consisting of oxidized polyacrylonitrile fibers, pitch fibers, and rayon fibers is provided. A needler capable of needling layers of said fibrous fabric to one another is provided. A target density and thickness and a target fiber volume fraction for a brake disc or pad preform to be produced, and for a final brake disc or pad density to be produced therefrom, are set. The target density of the brake disc or brake pad preform to be produced will typically be 0.35 g/cc or higher. For instance, a target preform density can be in the range of 0.35 to 0.55 g/cc. The target final density of the brake disc or brake pad (final product) to be produced will typically be 1.70 g/cc or higher. The target thickness of the brake disc or brake pad preform to be produced will be in the range 0.5 to 2.5 inches, and typically within the range 1.0 to 1.5 inches. The target fiber volume fraction of the brake disc or brake pad preform is typically in the range 17% to 30%, preferably in the range 17% to 24%, e.g., in the range 20% to 21%.

In this method, two layers of the fibrous fabric are needled to one another and then needling sequential layers of the fibrous fabric are needled on top of the layers thereof which have previously been needled together, while running the needler at a needling rate of greater than 700 strokes per minute. In accordance with the present invention, the needler typically runs at a stroke speed of from 850 to 1250 strokes per minute to combine the fibrous fabric layers into a fibrous preform. When the needling procedure employed is annular needling, the RPM of the needler bowl may be increased by a factor of at least 50% above a conventional 2 RPM manufacturing speed. When using an annular needler, the first layer of fibrous fabric is typically placed on a pliable material, such as a foam ring, that allows the needles to penetrate without damaging the needles, and subsequent layers of fabric are placed one on top of the other over the foam ring of the needler. This needling step combines the fibrous fabric layers into a brake disc or pad preform. The foregoing steps are continued until the preform composed of needled fabric layers reaches the target density and thickness.

Once the needled fibrous preform has been prepared, the fibrous preform may be carbonized under constraint to obtain the target fiber volume fraction in the final carbon-carbon composite product. Alternatively, the carbonization of the fibrous fabric preform may be conducted with no constraint, thereby producing a carbon-carbon composite brake disc or pad with lower volume fraction in the final composite. Therefore, the final volume fraction and density of the end product is controlled by the level of compression during carbonization. They are typically from 17 to 30% and from 1.6 to 1.9 g/cc, respectively, depending on the desired final product density to be achieved. Subsequently, the resulting carbonized needled fibrous fabric preform may be densified via pitch or pitch and CVD/CVI processing in order to produce a carbon-carbon composite brake disc or pad which has a density of at least 1.70 grams per cubic centimeter. Often, the carbonized preform is die-cut to near net shape prior to densification.

An alternative embodiment of this invention provides a method of making a carbon-carbon composite brake disc or pad which is generally similar to the method described above, but which comprises the following steps: providing a fibrous fabric comprised of carbon precursor fibers selected from the group consisting of oxidized polyacrylonitrile fibers, pitch fibers, and rayon fibers; carbonizing the fibrous fabric; providing a needier capable of needling layers of said fibrous fabric to one another; setting a target density and thickness for a brake disc or brake pad preform to be produced; needling two layers of said fibrous fabric to one another and then needling sequential layers of said fibrous fabric on top of the layers thereof which have previously been needled together, while running the needier at a needling rate of greater than 700 strokes per minute (e.g., 850 strokes per minute or more), thereby combining the fibrous fabric layers into a brake disc or pad preform; continuing the preceding step until the preform composed of needled fabric layers reaches the target density and thickness; and infiltrating the resulting carbonized needled fibrous fabric preform via CVD/CVI processing in order to produce a carbon-carbon composite brake disc or pad which has a density of at least 1.70 grams per cubic centimeter.

Yet another related embodiment of this invention is a method of making a carbon-carbon composite brake disc or pad which comprises the steps of: optionally, pre-carbonizing a fibrous fabric made from oxidized polyacrylonitrile fiber fabric, pitch fiber fabric, or carbon fiber fabric; needling a first layer of pre-cut segments of said fibrous fabric on a foam base in a needier, e.g., and annular needier; layering subsequent layers of pre-cut segments of said fibrous fabric onto the first layer on the foam base in the needier (a foam ring when an annular needier is used); running the needier at a needling rate of greater than 700 strokes per minute while increasing the bowl rotation to greater than 2 revolutions per minute to combine the fibrous fabric layers into a fibrous preform (the RPM of the needier bowl is increased by a factor of 50% above conventional manufacturing RPM); continuing the foregoing steps until the needled fabric layers reach the desired thickness and weight; where said fibrous fiber fabric has not been pre-carbonized, carbonizing the resulting needled fibrous fabric preform; and infiltrating the resulting carbonized needled fibrous fabric preform via pitch or pitch and CVD/CVI processing in order to produce a carbon-carbon composite brake disc or pad which has a density of at least 1.60 grams per cubic centimeter. In this embodiment, pitch or pitch and CVD/CVI infiltration of the carbonized needled fibrous fabric preform may be conducted on a preform which is not constrained, in order to produce a higher density final carbon-carbon composite brake disc or pad. This can also be achieved in the present invention by replacing the lower density carbon fibers in the preform with higher density carbon, which carbon is deposited via pitch infiltration (and, if desired, CVI/CVD processing).

In general, for aircraft brake disc applications the needlers are designed to handle either annular or non-annular preform geometries. Typically, for annular preforms the key parameters which affect cycle time and cost are needler stroke speed, bowl rotational speed, and needle pattern density as well as fiber costs. For non-annular preforms, the key process parameters affecting cycle time and cost are needler stroke rate and needle pattern density as well as fiber costs.

In the case of annular preforms, the key process parameters affecting cycle time are needle stroke rate (typically 700 strokes/min) and the rotational bowl speed (typically speed is 2 rpm). Increasing the bowl rotation rate by 50% (3 rpm) while keeping the number of needling strokes per minute at 350:1 allows the cycle time which is necessary to produce the preform to be reduced by about 33%. Another cost advantage from the faster cycle time is the reduction in capital investment necessary to produce a given quantity of preforms.

Reducing the volume fraction of carbon fiber used in the final composite leads to reduced materials costs and cycle times. The fiber volume fraction of the final carbonized preform can be controlled during the carbonization process by the amount of pressure applied to the preforms (constrained to unconstrained). In addition to the reduced material costs, and reduced capital investments, overall labor cost is also reduced through shorter cycle times.

An additional benefit obtained from a lower volume fraction of carbon fiber used in the preform is that the final density of the C—C composite can be increased, or for a given final density, the number of cycles of required to achieve a given degree of densification can be reduced. The increase in final density is achieved by replacing the lower density carbon fiber precursors (e.g., PAN, rayon) in the preforms with higher density carbon deposited via pitch infiltration (and, if desired, CVD/CVI processing). That is, more open (less densely packed) fabric layers may be employed, into which high density carbon from pitch or from pitch and CVI/CVD processing is substituted. The PAN fiber (fabric) less dense than the carbon particles provided by the pitch infiltration or CVD/DVI processing. Also, the more open fabric has wider, deeper pores, which are easier to infiltrate by the pitch or CVD/CVI gases. Therefore, fewer densification cycles are required to meet final density requirements, thereby providing additional capital avoidance for CVD/CVI investment.

Manufacturing Parameters.

Typically, this invention employs oxidized fibers to make the preforms and subsequently the carbon-carbon composite friction materials (e.g., brake discs and pads). The oxidized fibers may be subjected to low temperature or high temperature heat treatments in accordance with techniques that are known in the art. The oxidized fibers are generally used in the form of woven or nonwoven oxidized fabrics. The oxidized fabrics may be subjected to low temperature or high temperature carbonization processing in accordance with techniques that are known in the art. The oxidized fabrics may be joined together in the present invention by rotating annular needling, by non-rotating annular needling, or by non-annular needling. In each case, an optional constrained or unconstrained carbonization step may be employed. Likewise in each case, and optional die cutting step may be employed. Subsequent to the carbonization and/or die cutting step if used, pitch densification is employed. In each case, an optional heat treatment step may be employed after the densification step. The carbon-carbon composite is then subjected to a final machining step.

Background disclosure relevant to the needling technology which is improved upon in the present invention may be found in: U.S. Pat. No. 5,338,320, entitled "Production of Shaped Filamentary Structures;" U.S. Pat. No. 5,882,781, entitled "Shaped Fibrous Fabric Structure Comprising Multiple Layers of Fibrous Material;" and U.S. Pat. No. 6,691,393 B2, entitled "Wear Resistance in Carbon Fiber Friction Materials." The disclosure of each of U.S. Pat. No. 5,338,320, U.S. Pat. No. 5,882,781, and U.S. Pat. No. 6,691,393 B2 is incorporated herein by reference.

A non-annular needler does not need a foam ring. Typically a base plate with holes that match the needle pattern is used, since there is no bowl and there is no rotation of the bowl. A foam ring (or similar pliable, soft material) is only required for an annular needler.

Following manufacture of the preform, it is the carbonization step that is used (constrained or unconstrained) to control the final volume fraction of the final composite (and final density). If a preform has the same amount of fiber as the baseline preform material, the final fiber volume fraction of the composite can be decreased and final density can be increased if non-constrained carbonization is used (but the composite would be thicker). If a preform has less fiber than the baseline preform material, the final volume fraction and density could be kept the same as the baseline if the carbonization is constrained (but a thinner preform would result). But if carbonization is left unconstrained, the final composite would have lower fiber volume fraction, and higher density (with same thickness (compared with baseline).

The fabrics—for instance, nonwoven PAN segments—are commercially available. In accordance with the present invention, they are needled as described herein, then carbonized (that is, converted to carbon fiber) at temperatures in the range 1000-2700° C. They are then die-cut to a nominal size (if required) for a given platform, and densified by CVD/CVI processing. Finally, they are subjected to a final heat treatment at a temperature typically in the range 1000-2540° C.

Carbonization.

The carbonization process as it is applied to carbon-fiber precursor fibrous materials is in general well known to those skilled in the art. The fiber preforms are typically heated in a retort under inert or reducing conditions to remove the non-carbon constituents (hydrogen, nitrogen, oxygen, etc.) from the fibers. Carbonization can be carried out either in a furnace, a hot isostatic press, an autoclave, or in a uniaxial hot press. In each of these techniques, the fibrous fabric is heated to the range of 600° to about 1000° C. while maintaining an inert atmosphere in the pressure range of 1 to 1000 atmospheres. In one approach, for instance, the retort may be purged gently with nitrogen for approximately 1 hour, then it is heated to 900° C. in 10-20 hours, and thence to 1050° C. in 1-2 hours. The retort is held at 1050° C. for 3-6 hours, then allowed to cool overnight. Carbonization is typically carried out up to 1800° C.

VPI.

Vacuum Pressure Infiltration ("VPI") is a well known method for impregnating a resin or pitch into a preform. The preform is heated under inert conditions to well above the melting point of the impregnating pitch. Then, the gas in the pores is removed by evacuating the preform. Finally, molten pitch is allowed to infiltrate the part, as the overall pressure is returned to one atmosphere or above. In the VPI process a volume of resin or pitch is melted in one vessel while the porous preforms are contained in a second vessel under vacuum. The molten resin or pitch is transferred from vessel one into the porous preforms contained in the second vessel using a combination of vacuum and pressure. The VPI process typically employs resin and pitches which possess low to medium viscosity. Such pitches provide lower carbon yields than do mesophase pitches. Accordingly, at least one additional cycle of pitch infiltration of low or medium char-yield pitch (with VPI or RTM processing) is usually required to achieve a final density of 1.7 g/cc or higher.

RTM.

Resin Transfer Molding ("RTM") is an alternative to the use of VPI for the production of polymer-based composites. In Resin Transfer Molding, a fibrous preform or mat is placed into a mold matching the desired part geometry. Typically, a relatively low viscosity thermoset resin is injected at low temperature (50 to 150° C.) using pressure or induced under vacuum, into the porous body contained within a mold. The resin is cured within the mold before being removed from the mold. U.S. Pat. No. 6,537,470 B1 (Wood et al.) describes a more flexible RTM process that can make use of high viscosity resin or pitch. The disclosure of U.S. Pat. No. 6,537,470 B1 is incorporated herein by reference.

CVD/CVI.

Chemical vapor deposition (CVD) of carbon is also known as chemical vapor infiltration (CVI). In a CVD/CVI process, carbonized, and optionally heat treated, preforms are heated in a retort under the cover of inert gas, typically at a pressure below 100 torr. When the parts reach a temperature of 900° to 1200° C., the inert gas is replaced with a carbon-bearing gas such as natural gas, methane, ethane, propane, butane, propylene, or acetylene, or combinations of these gases. When the hydrocarbon gas mixture flows around and through the fiber preform porous structures, a complex set of dehydrogenation, condensation, and polymerization reactions occur, thereby depositing the carbon atoms within the interior and onto the surface of the fiber preform porous structures. Over time, as more and more of the carbon atoms are deposited onto the carbon fiber surfaces, the fiber preform becomes more dense. This process is sometimes referred to as densification, because the open spaces in the fiber preform are eventually filled with a carbon matrix until generally solid carbon parts are formed. Depending upon the pressure, temperature, and gas composition, the crystallographic structure and order of the deposited carbon can be controlled, yielding anything from an isotropic carbon to a highly anisotropic, ordered carbon. US 2006/0046059 A1 (Arico et al.), the disclosure of which is incorporated herein by reference, provides an overview of CVD/CVI processing.

Heat Treatment.

Intermediate and/or final heat treatment of the preforms is usually applied to modify the crystal structure of the carbon. Heat treatment is employed to modify the mechanical, thermal, and chemical properties of the carbon in the preform. Heat treatment of the preforms is typically conducted in the range of 1400° to 2800° C. The effect of such a treatment on graphitizable materials is well known. Higher temperatures increase the degree of crystalline order in the carbon material, as measured by such analytical techniques as X-ray diffraction or Raman spectroscopy. Higher temperatures also increase the thermal conductivity of the carbon in the products, and the elastic modulus of the final C—C composite.

Machining the Surfaces of the Preform.

Standard machining processes, well know to persons skilled in the art of manufacturing carbon-carbon composite brake discs, are used in the manufacture of the carbon-carbon composite friction discs provided by the present invention. Between densification processing steps, the surfaces of the annular discs are ground down to expose porosity in the surfaces. Once the final density is achieved, the annular discs are ground to their final thickness using standard grinding equipment to provide parallel flat surfaces, and then the inside diameter and outside diameter regions are machined, typically using a CNC (computer numerical control) Mill to provide the final brake disc geometry, including such features as rivet holes and drive lugs.

Reduced Usage of CVI/CVD

This invention utilizes low cost isotropic and/or mesophase pitch feedstocks to densify carbon fiber preforms by, for example, VPI and/or RTM equipment in place of or in combination with CVI/CVD processing, thereby providing reduced manufacturing cycle times and costs as well as reducing the need for expensive densification equipment. Brake discs manufactured in accordance with this invention have higher densities and better thermal characteristics, which result in improved mechanical properties and friction and wear performance as compared with comparable CVI/CVD-densified brake discs.

EXAMPLES

The following non-limiting examples illustrate some specific embodiments of the present invention. Persons skilled in the art will readily conceive of many other possible manufacturing procedures which will take advantage of the benefits provided by the present disclosure. The choice of pitch and impregnation equipment depends on the friction and wear application and the level of friction and wear requirements.

Example 1

Pre-cut segments of oxidized polyacrylonitrile (O-PAN) fiber nonwoven fabric are layered on a foam ring in a needler. The segments are pre-cut based upon the size of the brake disc to be produced. The RPM of the needler bowl is increased by a factor of 50% compared to conventional needling while maintaining the needling strokes per minute and bowl RPM at a ratio of 350:1. The needles, which have barbed ends, push through the PAN fiber segments and bind each subsequent layer by punching, pushing, or pulling loose fibers through each layer during the downstroke and upstroke. The first layer is needled to the foam ring. Additional needling of layers continues until the desired weight and thickness is achieved (density). The preform is then carbonized at a temperature of 1600° C. and a pressure of two atmospheres, and subsequently die-cut. Then the carbonized preform is subjected to Vacuum Pitch Infiltration, employing a low cost isotropic coal tar pitch, at a pressure of 100 psi. The pitch-infiltrated preform is then carbonized (charred) at a temperature of 810° C., and subsequently heat-treated at a temperature of 1600° C. The resulting strengthened, heat-treated disc is then subjected to Resin Transfer Molding with a synthetic naphthalene mesophase pitch (AR pitch from Mitsubishi Gas Chemical Co.) at a pressure of 900 to 1600 psi. At this point, oxidative stabilization is carried out at a temperature of 170° C. to advance the pitch and prevent its exudation during carbonization. The stabilized RTM-pitch-infiltrated disc is carbonized at a temperature of 810° C., and then heat-treated at a temperature of 1600° C. At this point, the brake disc preform is subjected to a single final cycle of CVD/CVI densification, followed by final machining and treatment with anti-oxidant solution, to prepare the desired carbon-carbon composite brake disc. A significant benefit of the overall foregoing manufacturing procedure is the reduced cycle time which it provides (about 33%), along with the reduction in capital requirements obtained through increased throughput and lower investment in costly CVD/CVI furnaces. This example also provides a reduction in materials cost (about 22%) compared to the use of conventional fiber volume preforms. There is an additional capital savings due to the need for fewer needlers.

Example 2

Pre-cut segments of oxidized polyacrylonitrile (O-PAN) fiber nonwoven fabric are layered on a foam ring in a needler. The segments are pre-cut based upon the size of the brake disc to be produced. The RPM of the needler is increased by a factor of 50% compared to conventional needling while maintaining the needling strokes per minute and bowl RPM at a ratio of 350:1. The needles, which have barbed ends, push through the PAN fiber segments and bind each subsequent layer by punching, pushing, or pulling loose fibers through each layer during the downstroke and upstroke. The first layer is needled to the foam ring. Additional needling of layers continues until a targeted weight and thickness is achieved. The preform is then carbonized at a temperature of 1600° C. at atmospheric pressure, and subsequently die-cut. Then the carbonized preform is subjected to CVD/CVI processing. The CVD/CVI-gas-infiltrated preform is then carbonized (charred) at a temperature of 810° C., and subsequently heat-treated at a temperature of 1600° C. The resulting strengthened, heat-treated disc is then subjected to Resin Transfer Molding with a synthetic naphthalene mesophase pitch (AR pitch from Mitsubishi Gas Chemical Co.) at a pressure of 900 to 1600 psi. At this point, oxidative stabilization is carried out at a temperature of 170° C. to advance the pitch and prevent its exudation during carbonization. The stabilized RTM-pitch-infiltrated disc is carbonized at a temperature of 810° C., and then heat-treated at a temperature of 1600° C. At this point, the brake disc preform is subjected to a single final cycle of CVD/CVI densification, followed by final machining and treatment with anti-oxidant solution, to prepare the desired carbon-carbon composite brake disc. A significant benefit of the overall foregoing manufacturing procedure is the reduced cycle time which it provides (about 46%), along with the reduction in capital requirements obtained through increased throughput and lower utilization of costly CVD/CVI furnace time. This example also provides a reduction in materials cost (about 22%) compared to the use of conventional fiber volume preforms. There is an additional capital savings due to the need for fewer needlers.

Example 3

Pre-cut segments of oxidized polyacrylonitrile (O-PAN) fiber nonwoven fabric are layered on a foam ring in a needler.

The segments are pre-cut based upon the size of the brake disc to be produced. The RPM of the needier bowl is increased by a factor of 50% compared to conventional needling while maintaining the needling strokes per minute and bowl RPM at a ratio of 350:1. The needles, which have barbed ends, push through the PAN fiber segments and bind each subsequent layer by punching, pushing, or pulling loose fibers through each layer during the downstroke and upstroke. The first layer is needled to the foam ring. Additional needling of layers continues until the desired weight and thickness is reached for the preform. The preform is then carbonized at a temperature of 1600° C. and a pressure of two atmospheres, and subsequently die-cut. Then the carbonized preform is subjected to Vacuum Pitch Infiltration, employing a low cost isotropic coal tar pitch, at a pressure of 100 psi. The pitch-infiltrated preform is then carbonized (charred) at a temperature of 810° C., and subsequently heat-treated at a temperature of 1600° C. The foregoing steps (VPI with isotropic coal tar pitch at 100 psi, followed by carbonization at 810° C., followed by heat-treatment at 1600° C.) are repeated twice. VPI pressures may be elevated to 150 psi in the first repetition and to 200 in the second repetition. After a total of 3 VPI pitch densifications, the density of the preform reaches 1.55 g/cc. At this point, the brake disc preform is subjected to a single final cycle of CVD/CVI densification, followed by final machining and treatment with anti-oxidant solution, to prepare the desired carbon-carbon composite brake disc. A significant benefit of the overall foregoing manufacturing procedure is the reduced cycle time which it provides (about 33%), along with the reduction in capital requirements obtained through increased throughput. This example also provides a reduction in materials cost (about 22%) compared to the use of conventional fiber volume preforms. There is an additional capital savings due to the need for fewer needlers and lower utilization of CVD/CVI.

In addition to the above advantages, the density of the final carbon-carbon composite friction products produced by the present invention are typically greater than 1.75 g/cc. This compares favorably with the density of 1.7 g/cc which is typical for all-CVD/CVI-densified carbon-carbon composites. In addition, the density of the composites produced by the present invention is uniform through the thickness of the disc, so that stable friction and wear performance is provided throughout the life of the brake.

INDUSTRIAL APPLICABILITY

Densification of the preform with multiple cycles of pitch (e.g. coal tar pitch) in place of one or more CVD/CVI cycles provides a low cost method of manufacturing a low fiber volume carbon-carbon composite for friction and wear applications. The pitch densification step could be carried out in VPI and/or RTM modes, with isotropic or mesophase pitches derived from coal tar, petroleum, or synthetic pitches. In terms of manufacturing economics, the hybrid composite concept embodied in the present invention enables the use of low cost pitch materials combined with low cost capitalization to produce carbon friction materials with consistent properties and friction and wear performance.

The present invention has been described herein in terms of a preferred embodiment. Additions and modifications to the disclosed method of manufacturing carbon-carbon composites will become apparent to those skilled in the relevant arts upon consideration of the foregoing disclosure. It is intended that all such obvious modifications and additions form a part of the present invention to the extent they fall within the scope of the several claims appended hereto.

What is claimed is:

1. A method of making a carbon-carbon composite brake disc or brake pad, the method comprising:
    needling, via a needler, a plurality of layers of a fibrous fabric to one another at a needling rate greater than 700 strokes per minute until the fibrous fabric layers form a brake disc or brake pad preform defining a target thickness;
    carbonizing the preform to reduce a fiber volume fraction of the preform, wherein carbonizing comprises carbonizing the preform until the fiber volume fraction of the preform is in a range of 17% to 30%;
    densifying the carbonized preform, wherein densifying the carbonized preform comprises densifying the carbonized preform with pitch;
    carbonizing the densified preform; and
    infiltrating the carbonized, densified preform via chemical vapor deposition/chemical vapor infiltration (CVD/CVI) processing until the infiltrated preform forms a carbon-carbon composite brake disc or brake pad defining a through-thickness density of at least 1.60 grams per cubic centimeter.

2. The method of claim 1, wherein carbonizing the preform comprises carbonizing the preform until the fiber volume fraction of the preform is in a range of 17% to 24%.

3. The method of claim 1, wherein carbonizing the preform comprises carbonizing the preform until the fiber volume fraction of the preform is in a range approximately 20% to approximately 21%.

4. The method of claim 1, wherein a density of the preform after needling and prior to carbonization is in a range of 0.35 grams per cubic centimeter to 0.55 grams per cubic centimeter.

5. The method of claim 1, wherein the uniform through-thickness density of the infiltrated preform is in a range of 1.6 grams per cubic centimeter to 1.9 grams per cubic centimeter.

6. The method of claim 1, wherein carbonizing the preform comprises carbonizing the preform while the preform is unconstrained.

7. The method of claim 1, wherein the needler comprises an annular needler, and wherein needling the plurality of layers of fibrous fabric to one another comprises needling at a bowl rotation of greater than two revolutions per minute (RPMs).

8. The method of claim 1, further comprising, after densifying the carbonized preform and prior to carbonizing the densified preform, performing oxidative stabilization of the pitch within the preform.

9. The method of claim 1, further comprising, after carbonizing the preform to reduce the fiber volume fraction of the preform and prior to densifying the carbonized preform, opening surface porosity of the preform via machining of the preform.

10. The method of claim 1, wherein the plurality of layers of fibrous fabric comprises at least one of polyacrylonitrile fibers, pitch fibers, and rayon fibers.

11. The method of claim 1, wherein the needler comprises an annular rotating needler, an annular non-rotating needler, or a non-annular needler.

12. The method of claim 1, wherein carbonizing the preform comprises carbonizing the preform at a temperature in a range of 1200° C. to 2540° C. until the preform exhibits the fiber volume fraction in the range of 17% to 30%.

13. The method of claim 1, wherein densifying the carbonized preform with pitch comprises densifying the carbonized preform with pitch via at least one of vacuum pressure infiltration (VPI) or resin transfer molding (RTM) processing.

14. The method of claim 1, wherein the through-thickness density of the infiltrated preform is at least 1.75 grams per cubic centimeter.

15. The method of claim 1, wherein densifying the carbonized preform further comprises densifying the carbonized preform via CVD/CVI processing.

16. The method of claim 1, further comprising, after carbonizing the densified preform and prior to infiltrating the carbonized, densified preform via CVD/CVI processing, heat-treating the preform at a temperature in a range of 1200° C. to 2540° C.

17. The method of claim 1, further comprising, after infiltrating the carbonized, densified preform via CVD/CVI processing, heat-treating the preform at a temperature in a range of 1200° C. to 2540° C.

18. The method of claim 1, wherein carbonizing the densified preform comprises carbonizing the densified preform at a temperature in a range of 600° C. to 1200° C.

19. The method of claim 1, wherein carbonizing the preform comprises carbonizing the preform without a weight placed on top of the preform.

* * * * *